Oct. 11, 1938.  H. D. STEVENS  2,132,835
CUTTER
Filed July 8, 1936   2 Sheets-Sheet 1
Fig. 1.
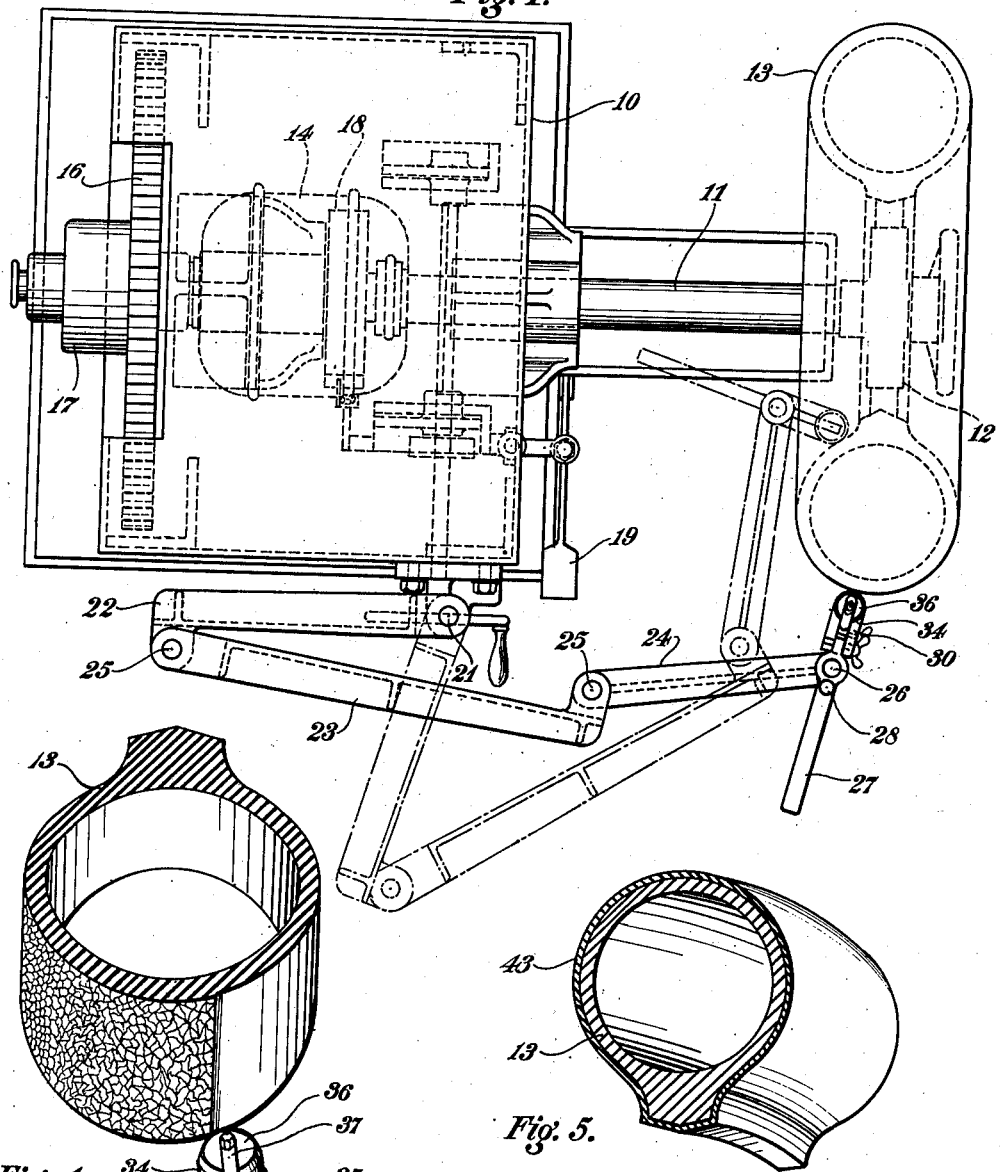
Fig. 4.
Fig. 5.
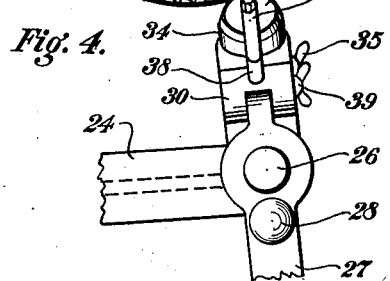
INVENTOR
HORACE D. STEVENS
BY
ATTORNEY Oct. 11, 1938. H. D. STEVENS 2,132,835
CUTTER
Filed July 8, 1936 2 Sheets-Sheet 2

INVENTOR
HORACE D. STEVENS
BY
ATTORNEY

Patented Oct. 11, 1938

2,132,835

UNITED STATES PATENT OFFICE 2,132,835

CUTTER

Horace D. Stevens, Akron, Ohio, assignor to The Firestone Tire & Rubber Company, Akron, Ohio, a corporation of Ohio Application July 8, 1936, Serial No. 89,673

4 Claims. (Cl. 164—69)

This invention relates to cutters such as may be used, for example, for removing a surface layer of material from a non-metallic article.

The invention may be advantageously employed for removing the over-vulcanized surface layer of rubber from the expansible rubber cores commonly utilized in the manufacture of pneumatic tire casings for applying heat and pressure to the interior of a tire casing while the latter is in a vulcanizing mold. During use as described, sulphur from the adjacent rubber structure of a tire migrates to the expansible core, with the result that eventually the surface layer of the latter becomes overcured, and becomes cracked or crazed. By removing the over cured rubber from the core, and then re-covering the latter with a layer of rubber containing little or no sulphur, it is possible greatly to lengthen the useful life of the core. The re-covering of core may be performed several times before the core eventually requires to be scrapped.

The chief object of the invention is to provide improved apparatus for removing the over-cured structure of an expansible rubber core. More specifically the invention aims to provide apparatus of the character mentioned employing a cutter for removing the rubber from the core; to provide an improved cutter for the purpose set forth; and to provide said cutter with gauge means for limiting the depth of its cut. Further objects include the provision of a cutter that is easily sharpened; and to provide a cutter having a plurality of cutting regions that may be utilized in succession upon the article to be cut. Other objects will be manifest as the specification proceeds.

Of the accompanying drawings:

Figure 1 is a plan view of apparatus embodying the invention, in its preferred form, and the work therein;

Figure 4 is a fragmentary detail plan view, on a larger scale, of the improved cutter and the work engaged thereby; and Figure 5 is a fragmentary sectional perspective view of an expansible core as it appears after it has been re-covered.

Figure 2:
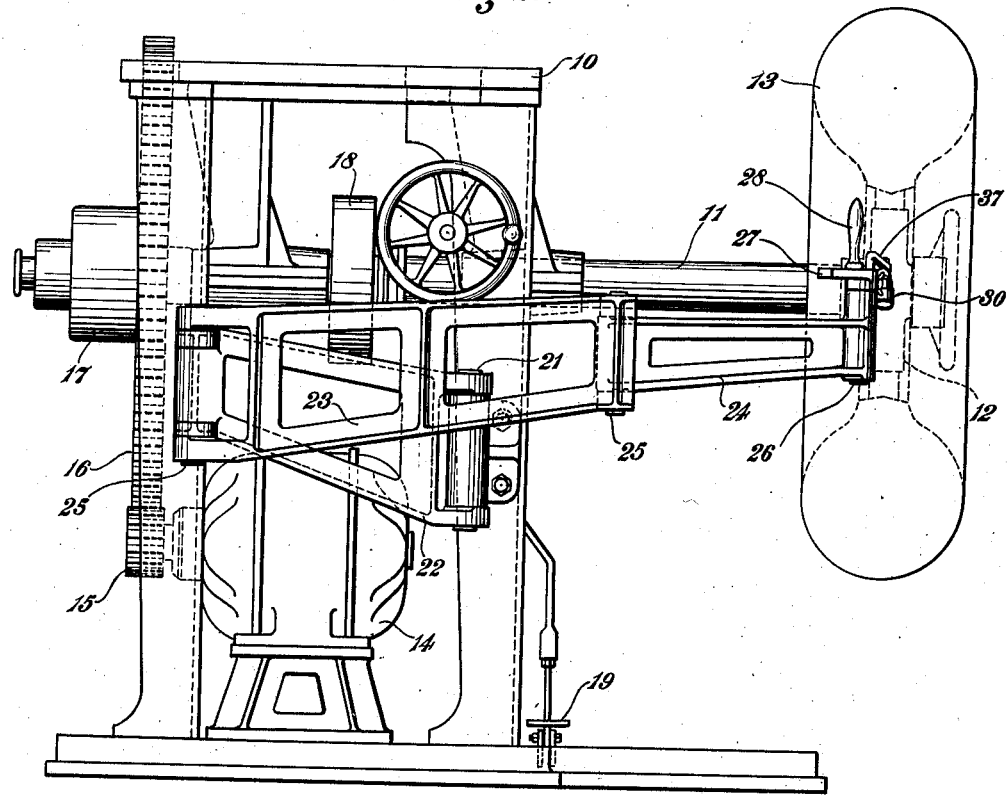
Figure 2 is a side elevation thereof.

Referring to the drawings, 10 is a frame housing from one side of which extends a horizontal rotatable spindle 11 that carries an expansible chuck 12 at its free end, and 13 is an expansible core that is mounted upon said chuck and rotated upon its own axis by rotation of the spindle 11. For rotating the latter, a constantly driven electric motor 14 in the bottom of the housing 10 carries a pinion 15 that is meshed with a gear 16, the latter being in axial alignment with spindle 11 and having driving connection with the latter through the agency of a clutch (not shown) disposed within the casing 17. Braking mechanism, generally designated 18, is mounted upon the spindle, and there is suitable means provided for concurrently opening said clutch and applying said brake when it is desired to stop rotation of the spindle, said means including a foot pedal 19.

Pivotally mounted at 21 upon the front side of the housing 10 (the near side as viewed in Figures 1 and 2) is an articulated bracket or cutter support comprising sections or arms 22, 23 and 24, which arms are hingedly connected end to end by hinge pins 25, 25. Mounted in the free end of arm 24 for movement about a vertical axis is a swivel 26 comprising a radially extending operating arm 27, and an upright hand grip member 28 positioned substantially at the axis of said swivel. At a point 29 on the swivel, diametrically opposite arm 27, a holder 30 is pivotally mounted for angular movement in a vertical plane, said holder resting upon an adjusting screw 31 that is threaded through a bracket-like formation 32 that is integral with the swivel. Seated in a counter-bored aperture 33 in the free end portion of the holder 30 is a cutter 34 that is tubular in form, and has its upper end exteriorly beveled to provide a cutting edge. A thumb-screw 35 is provided for securing the cutter in the holder. Concentrically disposed within the beveled cutting end of the cutter 34 is a substantially hemi-spherical cutter-gauge 36, the perimeter of which is in spaced relation to the inner surface of the tubular cutter, the convex surface of the gauge extending axially beyond the cutting edge of the cutter. The gauge 36 is supported from its upper end upon one end of an overhanging arm 37 that is attached at its other end to a post 38 that is slidably mounted in a suitable bore in the holder 30. A thumb-screw 39 is provided for holding the post 38 in longitudinally adjusted position, the arrangement permitting the gauge 36 to be adjustably positioned axially of the cutter 34.

Figure 3:
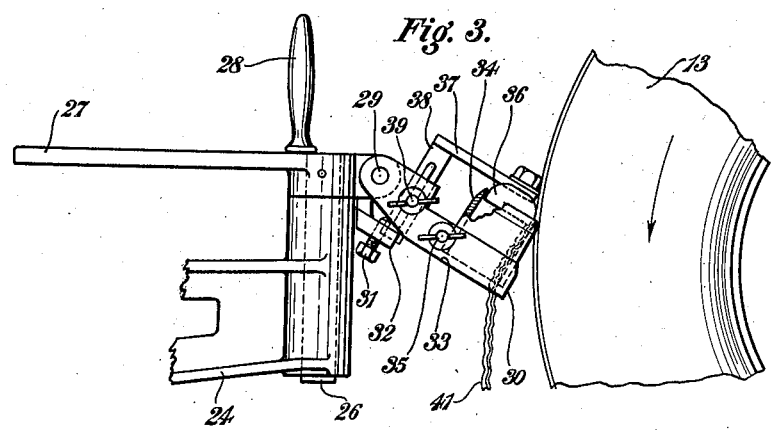
Figure 3 is a fragmentary detail elevation, on a larger scale, showing the improved cutter in engagement with the work, a part of said cutter being broken away and in section.

The cutter 34 is so positioned as to be engageable with the core 13 slightly above the axis of the latter, and said core is driven in the direction indicated by the arrow in Figure 3 so that the region of the core that is engaged by the cutter is moving in a downward direction. The arrangement is such that there is no tendency for the cutter to gouge into the work to a greater depth than desired, and smooth operation is effected. The angular position of the holder 30 is such that cutter-gauge 36 is engageable with the work 13 immediately anterior to the cutter 34 and thus is adapted to limit the depth to which the cutter penetrates. The depth of the cut may be varied by adjusting the position of the gauge axially of the cutter by means of the thumb-screw 39. The surface layer of the core 13 is cut therefrom in narrow ribbons 41 that pass through the tubular cutter and through aperture 33 of its holder 30 and drop to the floor beneath, as is most clearly shown in Figure 3.

In the operation of the device, the operator grasps the operating arm 27 with one hand and the hand grip member 28 with the other. Because of the articulated character of the main supporting bracket, and the wide arc of movement of the swivel 26, the operator is able to position the cutter 34 against any region of the surface of the core 13 except its inner peripheral face, which face is engaged by the chuck 12. In Figure 1 one alternative position of the cutter is shown in broken lines. Because of the arcuate character of the cutter, there is no difficulty in operating upon the transversely concave regions of the core adjacent its inner peripheral face. The operator usually begins cutting adjacent the inner periphery of the core, on one side thereof, as the core rotates, and slowly moves the cutter transversely around the core so as progressively to remove the over-cured surface therefrom, as shown in Figure 4. This completes a cycle of operation of the apparatus.

After the surface layer has been removed from all but the inner peripheral face of the core, the latter is dismounted from the chuck 12, and the overcured layer manually removed from the inner peripheral face of the core by means of a knife having a straight blade. Thereafter the entire surface of the core is covered with a layer of unvulcanized rubber composition 43 containing little or no sulphur, which layer may be adhered to the underlying structure with rubber cement. The recovered core is then placed in a mold and heated so as to vulcanize the bond between the layer 43 and the underlying rubber, the molding also serving to shape the exterior of the structure, which then presents the appearance shown in Figure 5.

The feature of providing a tubular cutter is advantageous in that it is possible easily to work upon concave surfaces of a core. Moreover, when one region of the cutter is dulled the cutter may be angularly adjusted to present another region thereof to the work, and when finally requiring to be sharpened it is a simple matter to rotate the cutter against an abrading wheel. The invention also makes for improved working conditions in that the air about the apparatus is not filled with dust, as is the case of apparatus employing a buff or rasp for removing the over-cured surface, the latter type of apparatus usually requiring the use of suction mechanism as a means for removing the material abraded from the work. The invention provides for removing the over-cured rubber to a determinate depth, and it achieves the other advantages set out in the foregoing statement of objects.

Modification may be resorted to without departing from the spirit of the invention or the scope of the appended claims, which are not limited wholly to the specific construction shown.

What is claimed is:

1. In apparatus of the character described, the combination of means for supporting and rotating an annular article in a vertical plane, an articulated sectional bracket on said supporting means movable in a horizontal plane, a holder swiveled on a vertical axis on the free end of said bracket, and a cutter carried by said holder and adapted to be manually guided into engagement with said article, in various regions transversely thereof, by reason of relative angular movement of the sections of the articulated bracket.

2. In apparatus of the character described, the combination of a cutter consisting of a tubular structure formed with an annular cutting edge on one end thereof, means for effecting relative movement of the cutter and the work to be cut, means supporting the cutter at such an angle to the work as to be engagable with the latter only in a local region of its cutting edge, and gauge means consisting of a generally hemispherical structure mounted concentrically within the cutter, in spaced relation to the wall thereof so as to enable trimmings from the work to pass through the cutter, and with its convex surface projecting beyond the cutting edge in position to engage the work ahead of the cutter.

3. A combination as defined in claim 2 including a support for said gauge means exteriorly of the cutter capable of adjustment to alter the position of the gauge means axially of the cutter.

4. In apparatus for removing the surface layer of an expansible, annular core used for vulcanizing pneumatic tires, the combination of means for supporting and rotating the core on its own axis, an articulated sectional bracket pivoted on said supporting means, a holder swiveled to the free end of said bracket, and a cutter comprising a tubular structure formed with a continuous circumferential cutting edge carried by said holder, said cutter being manually movable laterally about the core into cutting engagement with all surfaces thereof, except its inner circumference, by reason of relative angular movement of the bracket sections.

HORACE D. STEVENS.